(12) United States Patent
Schnier

(10) Patent No.: US 7,934,896 B2
(45) Date of Patent: May 3, 2011

(54) NUT HAVING AT LEAST TWO PARTS

(76) Inventor: Dietmar Schnier, Garbsen (DE)

( * ) Notice: Subject to any disclaimer, the term of this patent is extended or adjusted under 35 U.S.C. 154(b) by 182 days.

(21) Appl. No.: 12/223,731

(22) PCT Filed: Feb. 5, 2007

(86) PCT No.: PCT/EP2007/051064
§ 371 (c)(1), (2), (4) Date: Aug. 7, 2008

(87) PCT Pub. No.: WO2007/090805
PCT Pub. Date: Aug. 16, 2007

(65) Prior Publication Data
US 2009/0053010 A1 Feb. 26, 2009

(30) Foreign Application Priority Data
Feb. 8, 2006 (DE) .................... 10 2006 005 998

(51) Int. Cl.
*F16B 37/08* (2006.01)
(52) U.S. Cl. ........................ 411/433; 411/432
(58) Field of Classification Search .......... 411/432–434, 411/539, 935; 292/305
See application file for complete search history.

(56) References Cited

U.S. PATENT DOCUMENTS

| | | |
|---|---|---|
| 1,375,781 A | 4/1921 | DeLong |
| 2,257,327 A | 9/1941 | Bradford |
| 2,377,581 A * | 6/1945 | Shaffrey .................. 411/433 |
| 4,078,470 A | 3/1978 | Zeranick, Jr. et al. |
| 4,462,731 A | 7/1984 | Rovinsky et al. |
| 4,556,352 A * | 12/1985 | Resnicow .................. 411/433 |
| 4,826,376 A | 5/1989 | Aldridge et al. |
| 5,039,266 A * | 8/1991 | Nagayoshi et al. .......... 411/433 |
| 5,152,651 A * | 10/1992 | Arteon .................. 411/433 |
| 6,530,714 B2 * | 3/2003 | Schwarz .................. 403/280 |
| 6,821,070 B1 | 11/2004 | Thompson |

FOREIGN PATENT DOCUMENTS

| | | |
|---|---|---|
| DE | 1144542 | 2/1963 |
| DE | 7146313 | 3/1972 |
| DE | 3922957 C1 | 12/1990 |
| DE | 10015207 | 10/2001 |
| EP | 0408492 B1 | 9/1993 |

* cited by examiner

*Primary Examiner* — Gary Estremsky
(74) *Attorney, Agent, or Firm* — Muirhead and Saturnelli, LLC

(57) ABSTRACT

A nut includes an internal thread and at least two parts, each of the parts having a section of the internal thread which can be pushed onto an external thread in the radial direction. The parts may have connecting elements which interact and permit a relative displacement of the parts in a direction running radially to the axis of the internal thread into a position of use. The connecting elements may have guide surfaces which are inclined at an angle to the plane running radially to the axis of the internal thread and guide the parts in a rotational movement about an axis of rotation running transversely to the axis. A part may have a locking arm with a guide surface only on one side which produces the rotational movement during the displacement of the parts and bears against a complementary guide surface of the other part.

29 Claims, 9 Drawing Sheets

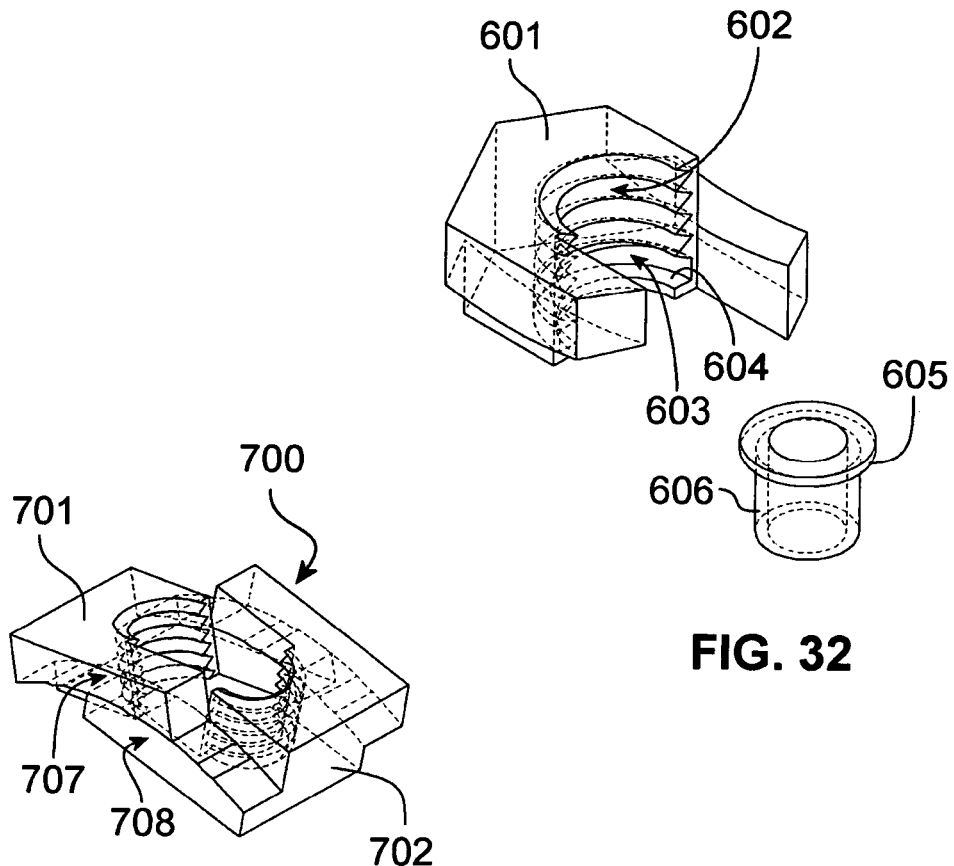
FIG. 32
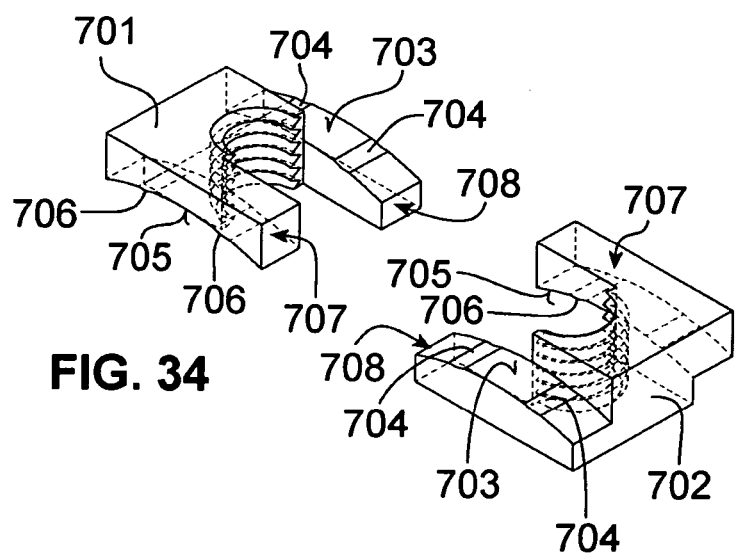
FIG. 33
FIG. 34

NUT HAVING AT LEAST TWO PARTS

TECHNICAL FIELD

This application relates to a nut having an internal thread and at least two parts.

BACKGROUND OF THE INVENTION

Nuts usually have a closed internal thread, thereby being screwable onto the end of an external thread. The external thread is formed, for example, by a threaded stud, by the shaft of a screw, by a threaded spindle or a threaded rod. In some cases it is difficult or impossible to screw a nut onto an external thread from the free end. For this reason, nuts having parts that can be slid onto an external thread in a radial direction have been proposed for a long time.

In the year 1921, U.S. Pat. No. 1,375,781 already proposed to slide a one-piece nut having half an internal thread onto a threaded stud in the radial direction. A similar one-piece nut is known from DE 39 22 957 C1. A similar nut is also to be derived from German Utility Model DE 71 46 313, in which the opening of the threaded section is slightly smaller than the diameter of the external thread, resulting in a certain amount of elastic bending of the nut when pushed onto the external thread.

Two-piece nuts are known from U.S. Pat. No. 4,556,352, for example. The two nut parts have cooperating catch projections securing the nut parts in the use position, in which the internal thread surrounds the external thread with a small clearance. In addition, locking pins are also provided, joining the nut parts together in a positive manner. The manufacture and handling of these nuts, in particular the attachment of the locking pins, are complex.

U.S. Pat. No. 6,821,070 B1 describes a nut having two parts pivotable relative to one another, each having half of an internal thread. The pivoting takes place about a pivot axis running parallel to the axis of the internal thread. A third part pivotable about this axis is provided and is additionally displaceable in the direction of the axis of the internal thread. When this is displaced, it engages behind a retaining projection on the first part, thereby blocking the pivoting movement. In this way, the second part having the internal thread section is secured in its use position. This design is also extremely complex to manufacture and handle.

U.S. Pat. No. 4,462,731 describes a nut made of two parts having internal thread sections onto which a rigid shell is pushed to secure these parts relative to one another. The shell also has two shell parts which cooperate with recesses of the parts having internal thread sections to achieve a positive connection. This arrangement is also complex to manufacture and complicated to handle.

U.S. Pat. No. 4,826,376 describes a two-part nut in which the parts are divided in a plane running radially to the axis of the internal thread. Furthermore, the parts are rotatable relative to one another. In a first rotational position, the openings connected to the internal thread sections of the parts are aligned with one another and the internal thread sections of the parts are situated directly one above the other. The parts may be pushed onto an external thread in this position. The parts may then be rotated 180° relative to one another, so that the internal thread sections and the openings in the two parts connected thereto are opposite one another. The external thread is then encircled from both sides in two different planes. This arrangement is also complicated to manufacture.

U.S. Pat. No. 4,078,470 describes a divided nut, which is divided along vertical planes into two supplementary halves, with intermediate surfaces being provided approximately in the middle of the height of the nut parts and extending along a flat plane at an acute angle to the horizontal to create a locking effect to prevent a direct horizontal separation. To separate the nut parts, they may be displaced in only one direction parallel to the plane of the intermediate surfaces. However, the problem here is that there is a force component acting radially to the thread due to the slope of the thread flanks in tightening the nut parts. This force component presses the two nut parts radially away from one another. The radial movement of the nut parts is not avoided completely but instead is only deflected into a movement at an inclination along the plane of the intermediate surfaces. There is the risk that the force acting radially outward created by the external thread might overcome the resistance due to the inclined position of the intermediate surfaces. For this reason, U.S. Pat. No. 4,078,470 proposes the use of securing elements such as a securing ring or a securing splint to prevent the nut parts from moving apart from one another radially. This arrangement is either insecure because the nut parts may become loose or is complicated and complex to handle due to the manufacture of the additional securing elements.

U.S. Pat. No. 2,257,327 describes a nut whose nut parts are articulated so they are pivotable relative to one another about a threaded stud (hinge pin 11), which extends on each side of the thread or above the thread. The hinge pin limits the mobility of the nut parts relative to one another and prevents the nut parts from being able to become completely detached from one another.

DE-A-1 144 542 describes a nut having the features of the preamble of Patent claim 1. Two nut parts are divided in a parting plane running in the direction of the axis of the thread. At least one part has at least one projection, which is insertable into a recess in the other nut part. The projections and the corresponding recesses in the nut parts are designed in the form of an arc of a circle, so that the nut parts are guided in a rotational movement about an axis of rotation running across the axis of the internal thread when the circular projection is pushed into the circular recess. These nut parts are difficult to manufacture because the recesses and projections have several undercuts. Furthermore, they are difficult to handle because the recesses and projections must be aligned accurately with one another to join them. Finally, the projections and the walls of the recesses cooperating with the shoulders have only a very small material thickness and consequently have a low strength.

Accordingly, it would be desirable to create a nut of the type defined in the introduction which is simple to manufacture and to handle.

SUMMARY OF THE INVENTION

According to the system described herein, a nut has an internal thread and at least two parts. Cooperating connecting elements having guide surfaces which cooperate in the use position of the parts in such a way that a radial displacement of the parts directed out of the use position and away from the external thread is blocked are situated on the parts of the nut. To reach the blocking use position, the parts of the nut are not only displaced radially but are also rotated and/or pivoted about an axis of rotation running across the axis of the internal thread. This rotational movement is possible only when the screw connection is loosened. When the screw connection is tightened, the nut is supported at one contact surface or multiple contact points on an opposing supporting surface, which is connected to the external thread non-displaceably in the axial direction. At least one nut part has at least one locking arm. The locking arm has two sides which are oriented with respect to the thread axes in opposite directions. These sides may also be referred to as the top side and bottom side, if it is assumed that the thread axis runs from top to bottom. Only one of these two sides of the locking arm has a guide surface, which induces the rotational movement and is in contact with a complementary guide surface of the other part, which is oriented in the opposite direction. The other side of the locking arm may in practice form the outside of the nut part (top side or bottom side) and may function as an abutment surface for the supporting surface against which the nut is screwed.

The locking arm having the guide surface on the first nut part and the cooperating section of material of the second nut part may have a great material thickness. It is possible for the material thickness of these sections of material to correspond to half of the total thickness of the nut. This makes it possible to achieve a high stability and load-bearing capacity of these sections of material and thus of the nut as a whole. Furthermore, the guide surface of the locking arm as well as the guide surface cooperating therewith may extend over the entire length of the nut. This yields a large load-bearing surface and therefore a high load-bearing capacity.

If the contact surface of the nut, which is usually formed by its bottom side, is pressed against the supporting surface in the screwed-in state, then the pivoting of the nut parts is blocked and the nut may be released from the external thread of the screw or the threaded stud only by unscrewing it. However, if the nut is a certain distance away from the supporting surface after being unscrewed several revolutions, rotation or pivoting of the nut parts, which may then be separated from one another in the radial direction of the thread, is then possible.

It should be pointed out that the axis of rotation running across the axis of the internal thread need not necessarily run at a right angle to the axis of the internal thread. It may also run skew or at an inclination with respect to the axis of the internal thread. In practice, however, the axis of rotation will usually lie approximately radially to the axis of the internal thread.

In other words, the contact surface of the nut is at a distance amounting to one or more thread flights from the opposing supporting surface when the nut is pushed onto the external thread and pivoted. By screwing the nut by the number of revolutions corresponding to the number of thread flights, the contact surface of the nut is pressed against the opposing supporting surface, thereby blocking renewed pivoting of the nut parts and detaching of the parts from one another. Joining of the nut parts is facilitated by the fact that a guide surface, which induces the rotational movement of the nut parts, is situated on only one side of the locking arm. The opposing side of the locking arm, i.e., the side of the locking arm oriented in the opposite direction from the guide surface with respect to the thread axis, forms an outside surface of the nut on its top or bottom and may be in contact with a supporting surface when tightened. Since the locking arm cooperates with an opposing supporting surface to achieve the rotational movement on only one side, its thickness is not critical and need not comply with any certain manufacturing tolerances.

The pivoting movement or rotational movement of the parts about an axis across the axis of the internal thread in applying the nut parts to the external thread thus ensures that movement in the opposite direction is blocked when the nut parts are tightened. The nut formed from the parts is thereby secured on the external thread in a non-detachable manner.

Such a nut preferably has two parts. It has considerable handling advantages in comparison with conventional nuts. For example, the total length of the external thread need not be overcome by screwing the nut onto it. When brought into its use position, the nut need only be pushed onto the thread radially and pivoted and then tightened by a few turns. Both nut parts may also be secured in a partially pushed-together position in which they are pushed over the external thread up to the desired position. Only here are the parts pressed toward one another into the use position and then screwed tightly to the external thread.

It is also possible to apply a nut according to the system described herein to an external thread which does not have a free end. For example, the nut may be applied to a threaded section, which is delimited by thicker rod sections without a thread on both ends. The nut according to the system described herein consequently allows unusual types of joints with ease of handling and inexpensive manufacturing.

In practice, the connecting elements include guide surfaces which are in contact opposite one another and induce the rotation and are inclined by an angle to the plane running radially to the axis of the internal thread. This angle of the guide surfaces to the radial plane of the internal thread causes the nut parts not to be displaced simply radially toward one another but instead causes them additionally to be pivoted about an axis essentially in a radial plane of the internal thread.

In practice, the guide surfaces are preferably inclined by an angle of less than 20° to the radial plane of the internal thread. In this way, the pivoting movement required to connect the nut parts is not excessively great and collision of the contours of the threaded sections of the nut parts with the external thread during the pivoting movement is avoided. Should greater inclinations be desired, the colliding contours of the thread sections would have to be removed. However, the guide surfaces may also have a variable inclination to the radial plane and may be curved in a cylinder or coiled in a helix, for example.

To achieve the pivoting movement, the guide surfaces may be arranged in various ways. In the case of a nut, in which the internal thread sections of the two parts are separated along a parting plane extending in the direction of the thread axis, each part of the nut may have two guide surfaces situated on both sides of a central plane running at a right angle to the parting plane. If the direction in which the guide surfaces extend is referred to as the longitudinal direction, the central plane forms the central longitudinal plane, the two guide surfaces running on both sides of this central plane. Furthermore, the two guide surfaces of a nut part may be oriented in opposite directions with respect to the axis of the thread. Assuming that the thread axis runs from top to bottom, then the surface normal of the first guide surface of a nut part will point upward and the surface normal of the second guide surface of the same nut part will point downward. The complementary nut part is designed similarly. At least one part of the guide surfaces is situated on the locking arms. In the case of a suitable guide surface profile, this design of the inclined guide surfaces may result in the pivoting movement. For example, the guide surfaces may be situated on a coiled surface winding around a radial axis situated in the central plane, defining a helical movement when the two nut parts are pushed together. The two guide surfaces may also be situated on a lateral surface of a cylinder whose cylinder axis lies in the parting plane. In this case, the nut parts are pivoted about the cylinder axis toward one another when pushed together.

Alternatively, the nut having two parts, whose internal thread sections are divided along a parting plane extending in the direction of the thread axis, may have flat guide surfaces which are not curved or coiled. To achieve the pivoting movement, each part of the nut may have two guide surfaces on the two sides of the parting plane. On the first side of the parting plane, these guide surfaces are oriented in opposite directions with respect to the thread axis in comparison with those on the second side of the parting plane. In other words, the guide surfaces of a nut part on the first side of the parting plane face upward and those on the second side of the parting plane face downward. Furthermore, the guide surfaces on the first side of the parting plane are inclined in the opposite direction relative to the radial plane of the thread in comparison with the guide surfaces on the second side of the parting plane. In other words, the planes in which the guide surfaces are situated run like a pointed roof whose gables are situated on the thread axis. In this way, the parts may be pushed one inside the other with the axes of the internal thread sections of the parts being slightly pivoted toward one another. In the last section of the displacement movement, the parts are pivoted into the use position, namely about a pivot axis running radially to the thread axis and situated in the parting plane. In the use position, the axes of the internal thread sections of the two parts essentially coincide and the internal thread, which includes the two sections, extends around an external thread with corresponding dimensions essentially without any clearance. The nut formed in this way may then be tightened.

As already mentioned, the guide surfaces may have a curvature in the form of a lateral cylindrical surface section. The guide surface on the first nut part has a convex shape and the guide surface on the second nut part cooperating with the former has a concave shape according to the same lateral cylindrical surface. The approaching movement of the two nut parts over a more lengthy path of movement along the aforementioned lateral cylindrical surface may thus be guided by the guide surface.

In practice, the axis of the internal thread may coincide with a radius of the cylinder on whose lateral surface the guide surfaces run. The partition of the nut parts may also lie in a plane diametrically intersecting the cylinder. The rotation of the nut parts in movement into the use position then takes place by displacement of the lateral cylindrical guide surfaces relative to one another essentially about the axis of the lateral cylindrical surface situated in the parting plane of the nut parts.

As also already mentioned above, in another practical embodiment the guide surfaces may lie on a helical surface. The helix runs about an axis, for example, which runs at a right angle to the plane of the partition of the nut and radially to the axis of the internal thread and intersects the thread axis approximately in the middle of the internal thread. In this case, the nut parts are not rotated about an axis in the parting plane when joined together but instead are rotated in a helical movement about the axis running perpendicular to the parting plane of the nut.

In practice, the material of the nut, which is usually steel but may also be plastic depending on the application, may be elastically deformable. The shapes of two opposing guide surfaces of the nut parts may differ slightly from one another. The faces may be curved slightly differently or may be inclined relative to one another. Both features result in a certain deformation of the nut parts occurring when there is an increase in the pressure acting in the direction of the axis of the internal thread due to tightening of the nuts until the guide surfaces are in surface contact with one another. The guide surfaces of the nut parts then assume the function of a washer or a spring washer and additionally secure the screw connection to prevent loosening due to the dynamic alternating loads. This is also true when the bottom of the nut parts rests on the underlying supporting surface with only one or two points of contact. The supporting surface is the surface secured in the axial direction relative to the external thread against which the nut is supported in tightening. If this support is provided by only one or two contact points per nut part, then a torque is generated during tightening, deforming the nut parts elastically to some extent and thereby tilting them. The nuts are thus under elastic stress as when using a washer, such that with a dynamic load on the screw connection, the elastic stress ensures that the screw connection is blocked in a self-locking manner due to the stress.

Additionally, the connecting elements of the nut parts may have guide surfaces that are in mutual contact opposite one another and are situated in a plane extending parallel to the axis of the internal thread. This plane extending parallel to the axis of the internal thread preferably defines the direction of radial displacement of the two nut parts relative to one another. The additional guide surfaces thus cause the nut parts to be guided in the radial direction of the thread but not to rotate. Furthermore, additional guide surfaces in an axial plane (also referred to as a vertical plane) form the stops for the displacement of the nut which are active in the use position. These additional guide surfaces do not cause any pivoting of the nuts parts to achieve the use position, as mentioned, and consequently also do not act together in locking the nut parts against one another.

As already mentioned, the connecting elements, which necessitate pivoting of the nut parts to achieve their use position, cause the nut to be hindered in this pivoting movement when it is tightened due to the fact that its contact surface is in contact with a supporting surface connected to the external thread. The contact surface of the nut need not be designed to have contact over the full surface. It is sufficient if each part of the nut has at least one contact point, preferably two or three, which are in contact with the supporting surface fixedly connected to the external thread axially when tightened. As a rule, however, the nut will be in contact with the supporting surface through a contact surface. At least one section of this contact surface may be formed by the side of the locking arm which is opposite the guide surface causing the rotation.

The contact surface of each part of the nut may have on one edge an inclined surface which defines the angle of the pivoting movement of the nut part. To do so, the inclined surface forms an angle with the contact surface, which corresponds to the angle of rotation of the corresponding nut part as this part moves into its use position. In other words, the two nut parts may be pivoted by an angle corresponding to the pivot angle out of the assembly position into the use position due to pressure on their edges. In this pivoted state, the nut parts may be pushed slightly into one another via the supporting surface. In the last phase of movement, the nut parts are pivoted into their use position and then are tightened, whereupon they are locked due to the contact of the contact surface of the nut with the supporting surface.

Similarly, a nut may be designed to have a point-shaped contact. A contact point of a nut part together with at least two other points in the edge area of the nut part should define an inclined surface whose angle corresponds to the angle of rotation by which the part is rotated during assembly. The nut part may be pivoted into the assembly position by pressing on the edge area. In this position, the nut part may be displaced by a certain amount into the complementary nut part. The manual pivoting movement then takes place, with the thread sections of both nut parts being situated around the external thread and the use position being reached.

In practice, the thread flights may be removed in at least one end area of the internal thread section of at least one of the parts to allow rotation of the parts into the use position during the swiveling movement. Depending on the selected path of the movement of the nut parts relative to one another, partial removal of the thread flights prevents blocking of the closing movement. The internal thread sections may slightly touch the external thread during the pivoting movement, so that in the closing movement into the use position, an elastic deformation of the nut parts is necessary. The nut parts therefore snap around the external thread and are releasable again from the external thread only by applying an increased force that causes the aforementioned elastic deformation.

The nut according to the system described herein may also have a self-cutting thread. The removal in the area of the thread may be selected so that the thread functions as a thread cutter to cut the thread flights of the external thread. The nut may thus be used even better on non-rigid materials having no thread such as plastic rods or plastic-sheathed cables, e.g., as strain relief on electric power cables.

In an embodiment of the nut, the two nut parts may be identical. This is easily possible, for example, in the case of a double-flighted thread when the parts are rotationally symmetrical, i.e., are identical to one another when rotated by 180°, with respect to the thread axis or an axis of symmetry running in the parting plane and radially to the thread axis. In a conventional single-flighted thread, the identical nut parts may be rotationally symmetrical with respect to an axis of symmetry which lies in the parting plane and runs radially to the thread axis. The nut parts preferably have an inclined surface directed upward and an inclined surface directed downward, these faces being situated on two locking arms running at right angles to the parting plane, the locking arms acting as connecting elements. These inclined surfaces are in contact with the opposing inclined surfaces of the complementary part when joined. The parts are displaced onto one another in joining and one is screwed inside the other.

A nut that has two identical parts has the advantage that it is manufacturable in large numbers very inexpensively. In particular, each part of the nut may be manufactured in a compression molding operation. Furthermore, the user is able to join any nut parts together and need not select two nut parts that fit together.

In the case of nuts having a single-flighted internal thread, which may have externally symmetrical shapes but whose thread flights are not symmetrical, and in the case of asymmetrical parts there is the risk that the user may attempt to join the parts incorrectly. The top and the bottom of such parts may additionally be marked, e.g., by notches or other marks, to prevent errors in assembly. Incorrect joining may also be prevented, however, through suitable shaping of the connecting elements in that the external symmetry exists only with respect to one axis and is compensated by a different design of the guide surfaces with respect to the second axis. In this case, the parts obviously may not be joined together incorrectly.

In addition, the nut parts may include cooperating retaining elements which secure these parts against one another in the use position or shortly before that, i.e., in an at least partially assembled position. Without such retaining elements, there is the risk that when the nut is screwed onto the external thread, the parts might become unintentionally detached from one another as long as the contact surface is not pressed tightly against the supporting surface.

The retaining elements may be formed, for example, by mutually attracting magnets or a magnet and a ferromagnetic section of material. However, retaining elements that intertwine with each other in a positive manner such as catch projections and complementary catch recesses which secure a locked engagement of the nut parts in the use position are also possible. The nut parts may also be secured on the external thread or against one another through other suitable measures, in particular by shaping of the connecting elements (undercuts, deformation of the nuts, friction/tension on the external thread and against one another).

The nut according to the system described herein may be used as follows. When pushing the nut parts together radially, there is rotation, i.e., pivoting of the parts about an axis of rotation running across the axis of the internal thread, at least in the last phase of movement, just before the use position, in addition to the displacement of the parts.

With this rotation, two guide surfaces of the parts having a complementary curvature may slide one onto the other.

As mentioned, each part may be placed with an inclined surface which is in its edge area on a supporting surface connected to the external thread. In this way, the parts are in an inclined position relative to one another, facilitating the joining of parts. The parts are thus moved toward one another in an assembly position in which their connecting elements intermesh and subsequently guide the further movement of the parts.

The nut according to the system described herein may have a shoulder extending to the axis of the internal thread in the area of one end of the internal thread. This shoulder preferably has a ring shape protruding toward the center of the internal thread, one-half being on each nut part. In the manner of the union nut, the shoulder protruding radially inward may surround and press tightly against an end face of an external thread in tightening a radial step of an object such as a pipe connection that is to be screwed onto the external thread. The radial shoulder may be formed by a wall of a groove adjoining the internal thread. Unlike conventional screws, it is not necessary for the radial step of the object that is to be tightened to be pushed through the internal thread before being in contact with the shoulder protruding inward. When the nut parts are pushed together, the radial step of the object may be inserted into a groove in which the radial step is received with a small clearance. For this reason, it is also not necessary for the radial step and the groove or the shoulder of the nut to be round. They may have complementary shapes other than the round shape and may be joined together in a positive manner when the nut parts are pushed together.

According further to the system described herein, a tool may be provided for applying a nut of the type described above. This tool has a retaining device for each part of the nut. The retaining devices are joined together by driving means, in particular joint connections and lever connections in such a way that they either actively execute the displacement movement and the pivoting movement of the parts or at least passively allow it. First, they execute a displacement movement relative to one another in a direction running radially to the axis of the internal thread. They then execute a pivoting movement or rotational movement about an axis of rotation running across the axis of the internal thread at least in the last phase of movement before the parts in the nut have reached the use position. To this end, the retaining device may either be driven in a predefined path of movement or may at least have the required degrees of freedom due to joints.

For opening the nut, the tool may execute an opposing movement. The tool may be designed in the manner of pliers, for example, the retaining devices forming the two jaws of the pliers. They are driven via any gear by the two levers of the pliers in such a way that the pivoting movement or rotational movement required to reach the use position is executed. In the case of nut parts having retaining elements in particular, the tool may ensure that the retaining force of the retaining elements is reliably overcome to release the nut parts if manual removal of the nut parts from the external thread is impossible.

BRIEF DESCRIPTION OF THE DRAWINGS

Advantageous embodiments of the system described herein are explained below with reference to the attached drawings. It should be pointed out here that the outside contour of the nuts shown here in particular is only an example. Each embodiment may be designed to have any external contours and in particular as a square nut, a hexagonal nut, a wing nut or a cap nut.

In the drawings:

FIG. 32 shows a part of the nut to form a union nut in a schematic diagram;

FIG. 33 shows a schematic diagram of a nut having retaining elements in a partially assembled position; and FIG. 34 shows the two parts of a nut having retaining elements.

DETAILED DESCRIPTION OF VARIOUS EMBODIMENTS

Figure 1:
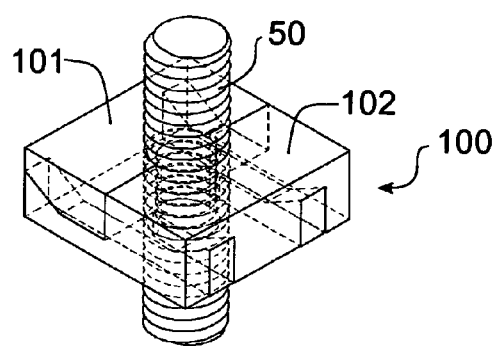
FIG. 1 shows a schematic diagram of a first embodiment of a nut according to the system described herein in the use position on an external thread.
Figure 2:
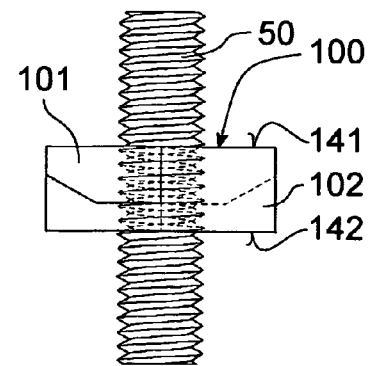
FIG. 2 shows a side view of the nut from FIG. 1.
Figure 3:
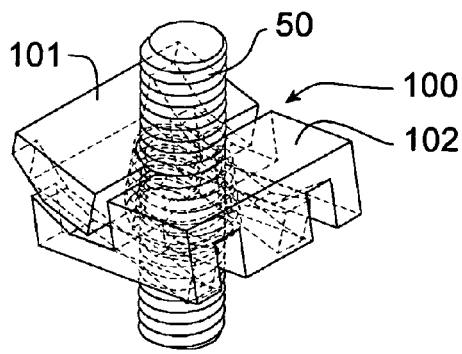
FIG. 3 shows a schematic diagram of the nut from FIG. 1 in a slightly opened position.
Figure 4:
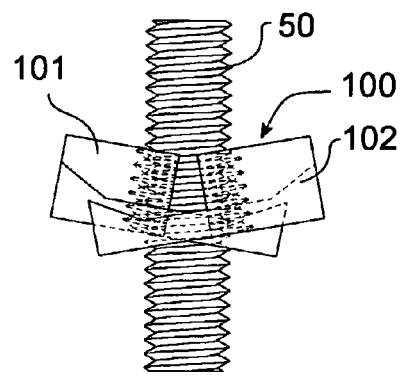
FIG. 4 shows a side view of the diagram from FIG. 3.
Figure 5:
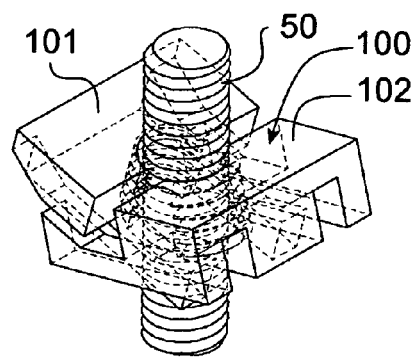
FIG. 5 shows a schematic diagram of the nut from FIGS. 1 and 3 in a more opened position.
Figure 6:
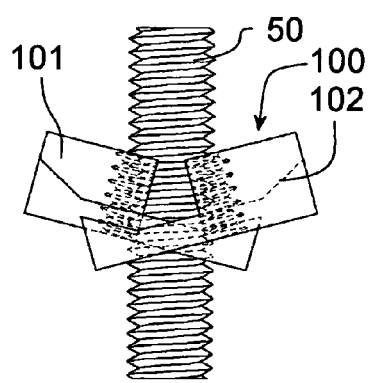
FIG. 6 shows a side view of the nut from FIG. 5.
Figure 7:
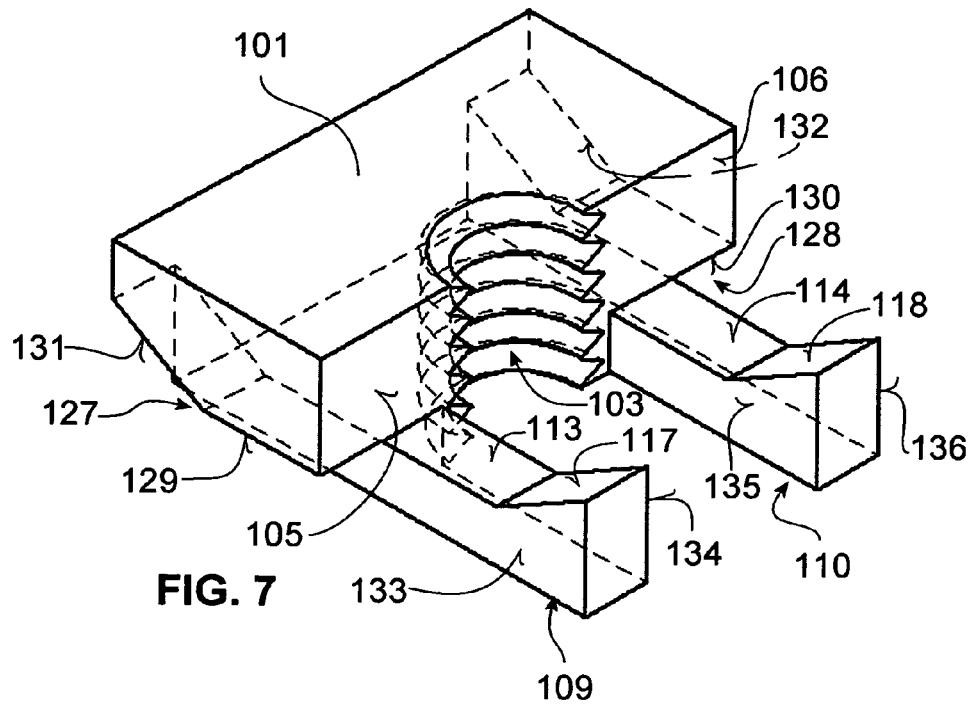
FIG. 7 shows a schematic diagram of the first part of the nut from FIGS. 1 through 6.
Figure 8:
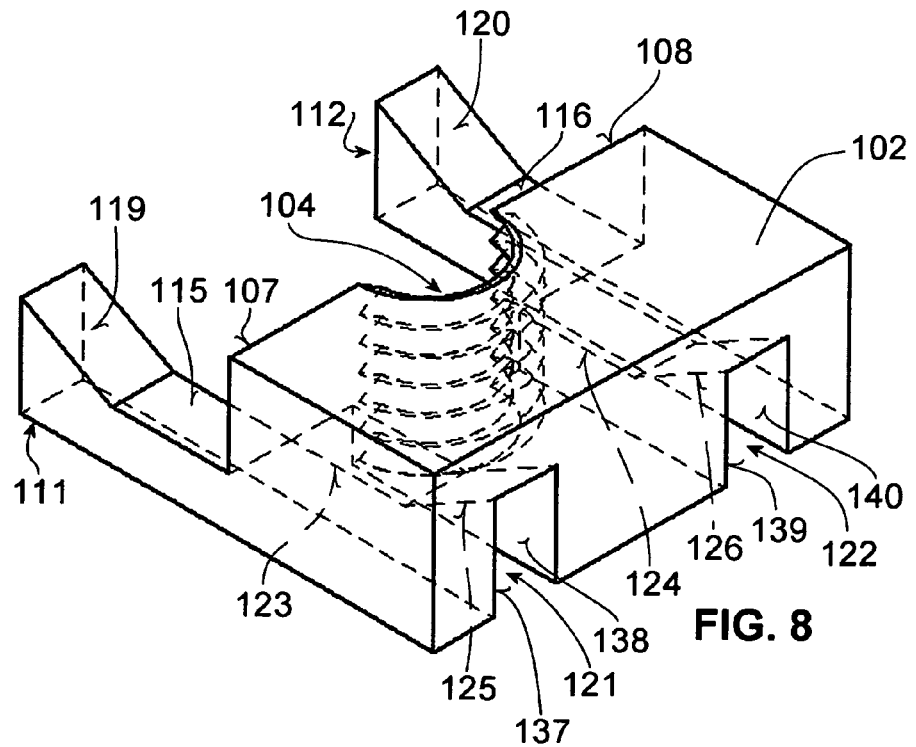
FIG. 8 shows a schematic diagram of the second part of the nut from FIGS. 1 through 6.

FIGS. 1 through 8 show a first embodiment of a nut 100 according to the system described herein. It has two parts 101, 102, which are complementary in shape. In FIGS. 1 and 2, parts 101, 102 are joined together in such a way that they surround an external thread 50 with a small clearance. This position of parts 101, 102 of the nut is referred to in this description as the use position. FIGS. 7 and 8 in particular show that each nut part 101, 102 has an internal thread section 103, 104, together forming an internal thread encircling external thread 50 with a small clearance in the assembled use position of nut parts 101, 102 (FIGS. 1 and 2).

Each internal thread section 103, 104 extends over 180° of the internal thread. The internal thread sections 103, 104 are separated from one another in a plane which contains the thread axis in the use position shown in FIGS. 1 and 2.

FIGS. 7 and 8 show that both nut parts 101, 102 have stop surfaces 105 through 108 running in the parting plane of the internal thread. In the use position, these stop surfaces 105 through 108 are opposite and in contact with one another (FIGS. 1 and 2). In the use position, the internal thread is closed and its thread flights surround the thread flights of external thread 50 with the usual thread clearance.

FIGS. 7 and 8 also show four locking arms 109 through 112. Two locking arms 109, 110 are provided on first nut part 101 and extend at an essentially right angle to stop surfaces 105 and 106. Two locking arms 111 and 112 are provided on second nut part 102 and extend at an essentially right angle to two stop surfaces 107 and 108.

Each locking arm 109 through 112 has a guide surface 113 through 116, which extends in a radial plane of the thread and to which an inclined guide surface 117 through 120 is connected. Inclined guide surfaces 117 through 120 extend in an area opposite stop surfaces 105 through 108 of same nut part 101, 102.

Second nut part 102 has two receiving grooves 121, 122 into which locking arms 109 and 110 of first nut part 101 are insertable. The width of receiving grooves 121, 122 corresponds essentially to the width of locking arms 109, 110. Receiving grooves 121, 122 likewise have a radial guide surface 123, 124 and an inclined guide surface 125, 126.

First nut part 101, however, has receiving sections 127, 128 in the outer area. Two locking arms 111, 112 of second nut part 102 are fitted into these receiving sections in the use position. Receiving sections 127, 128 each also have one guide surface 129, 130 running radially to the axis of the internal thread and have an inclined guide surface 131, 132. In the use position, the inclined guide surfaces 131, 132 of receiving sections 127, 128 are in contact with inclined guide surfaces 119, 120 of locking arms 111, 112. Likewise, inclined guide surfaces 125, 126 in receiving grooves 121, 122 of second nut part 102 are in contact with inclined guide surfaces 117, 118 of locking arms 109, 110 of first nut part 101. The situation is similar for radial guide surfaces 113 through 116 of locking arms 109 through 112, which are in contact with the respective corresponding radial guide surfaces 123, 124, 129, 130 of receiving groove 121, 122, or receiving section 127, 128.

As shown in FIGS. 3 through 6, inclined guide surfaces 117 through 120, 125, 126, 131, 132 slide against one another when two nut parts 101, 102 are separated by a distance from one another from the use position. Two nut parts 101, 102 are pulled apart in the direction of locking arms 109 through 112. Sliding the inclined guide surfaces on one another causes a tilting or rotational movement of two nut parts 101, 102 about an axis running radially to the axis of external thread 50 and extending in the parting plane of nut parts 101, 102, which is defined by stop surfaces 105 through 106 in the use position.

This tilting movement causes top side 141 and bottom side 142 of both nut parts 101, 102 to be buckled in deviation from a planar surface. The tilting movement is inhibited when top side 141 or bottom side 142 of nut 100 is in contact with a planar supporting surface. Thus, if the nut is screwed tightly against a supporting surface in the use position (FIGS. 1 and 2), the pivoting movement depicted in FIGS. 3 through 6 is no longer possible. The nut is kept closed by guide surfaces 113 through 120, 123 through 126, 129 through 132 and surrounds external thread 50 with a small clearance. Nut 102 is thus suitable for transmitting force in the axial direction of external thread 50.

However, if nut 100 is screwed so far onto external thread 50 that it is a distance away from a supporting surface, it may be opened and removed from external thread 50 according to the movement sequence depicted in FIGS. 1 through 6. Conversely, according to the movement sequence of FIGS. 6, 4 and 2 or 5, 3 and 1, it may be applied to an external thread 50 by intermeshing nut parts 101, 102. This eliminates the time-consuming screwing of nut 100 over the entire length of external thread 50 up to tightening. In addition, nut 100 may also be applied to external threads 50, the ends of which are not freely accessible. It may even be attached to external threads 50 which extend over only a partial section of a stud, so that it would be impossible to screw them onto the external thread from one end.

There are a variety of possible applications of the nut from FIGS. 1 through 8. It may in particular also be used to replace ordinary nuts, because joining nut parts 101, 102 radially saves time in comparison with screwing the nut onto a longer external thread. Due to the fact that inclined guide surfaces 117 through 120 on locking arms 109 through 112 and complementary inclined guide surfaces 125, 126, 131, 132 in receiving grooves 121, 122 and receiving sections 127, 128 guide nut parts 101, 102 in displacement relative to one another into a rotational movement or a pivoting movement, parts 101, 102 of nut 100 are locked securely in their use position when tightened against a contact surface running radially to external thread 50.

Additional guide surfaces 133 through 140 extending parallel to the thread axis guide both nut parts 101, 102 into the use position in the radial displacement movement. In doing so, axially parallel additional guide surfaces 133 through 136 of first nut part 101 are in contact with complementary axially parallel guide surfaces 137 through 140 in receiving grooves 121, 122 of second nut part 102 with a small clearance. The contact surface of nut 100 from FIGS. 1 through 8 may be formed by its top side 141 as well as by its bottom side 142.

FIGS. 9 through 15 show another embodiment of nut 200 according to the system described herein. Nut 200 also has two nut parts 201, 202. Nut part 201 has a first internal thread section 203 extending over 180°. Second nut part 202 has second opposing internal thread section 204.

Each nut part 201, 202 has two locking arms 205, 206 and 207, 208. Two locking arms 205, 206 and 207, 208 of a nut part 201 and 202 extend on both sides of a central plane running at a right angle to the parting plane of the internal thread. Both locking arms 205, 206 and 207, 208 of two nut parts 201 and 202 have a guide surface 209 through 212. Two guide surfaces 209, 210 and 211, 212 of each nut part 201 and 202 face essentially in opposite directions. Thus, with first nut part 201, guide surface 209 situated on the left side of the central plane in FIG. 11 faces downward and guide surface 210 on the right of the central plane faces upward. Accordingly and in addition, guide surface 211 of second nut part 202, which is situated on the left side of the central plane in FIG. 11, faces upward and guide surface 212 of nut part 202, which is situated on the right of the central plane, faces downward. Downward-facing guide surface 212 of locking arm 208 of the second nut part, which is situated on the right of the central plane, is in contact with guide surface 210 facing upward on locking arm 206 of the first nut part situated on the right of the central plane when in the use position. Accordingly, on the left of the central plane upward-facing guide surface 211 of the second nut part is in contact with downward-facing guide surface 209 of left locking arm 205 of first nut part 201.

Figure 9:
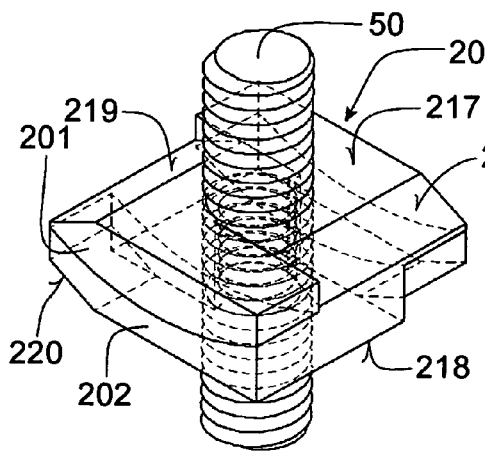
FIG. 9 shows a schematic diagram of a second embodiment of a nut according to the system described herein in a use position on an external thread.
Figure 10:
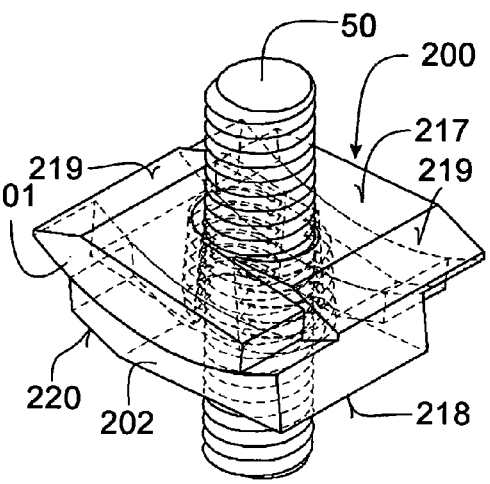
FIG. 10 shows a schematic diagram of the nut from FIG. 9 in a slightly opened position.
Figure 11:
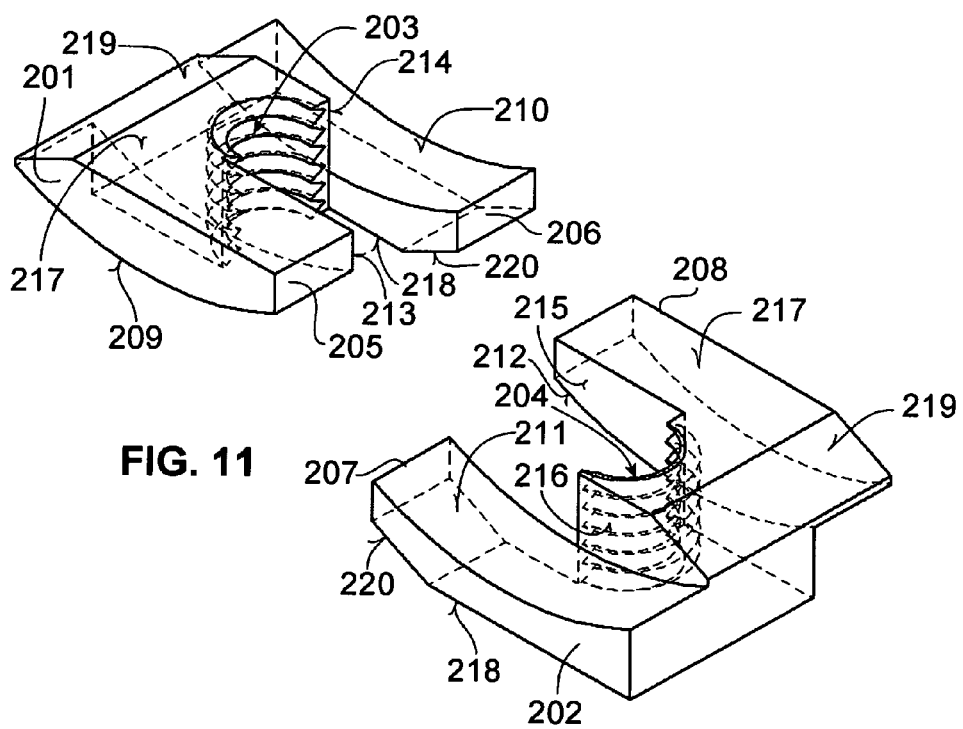
FIG. 11 shows a schematic diagram of the two individual nut parts from FIGS. 9 and 10.

The type of pivoting movement executed by two nut parts 201, 202 relative to one another when being detached from internal thread 50 is shown in FIG. 9 (use position in which the nut parts tightly surround the internal thread) and FIG. 10 (nut parts opened slightly). All guide surfaces 209 through 212 run along a joint lateral cylindrical surface, which is curved about a cylinder axis running at a right angle to the thread axis and situated in the parting plane of the internal thread. In this way, two nut parts 201, 202 are joined together or detached from one another by pivoting them along this lateral cylindrical surface.

Tilting of nut parts 201, 202 about an axis running parallel to locking arms 205 through 208 while pivoting along guide surfaces 209 through 212 in the form of a lateral cylindrical surface is prevented by additional opposing guide surfaces 213 through 216 extending parallel to the axis of the internal thread and in the displacement direction of the nut parts, i.e., perpendicular to the parting plane of the internal thread.

Pivoting along guide surfaces 209 through 212 curved in the form of a lateral cylindrical surface in turn results in top side 217 or bottom side 218 of nut 200 deviating from its planar embodiment as in the use position (see FIG. 9). Consequently, pivoting and detaching of nut 200 from external thread 50 are blocked when either top side 217 or bottom side 218 is pressed against a supporting surface by tightening it onto external thread 50.

The movement sequence in joining nut parts 201, 202 of the embodiment of nut 200 from FIGS. 9 through 15 corresponds essentially to the movement sequence in opening and closing nut parts 101, 102 in the embodiment from FIGS. 1 through 8. The nut parts are shifted relative to one another at a right angle to the parting plane of the internal thread while at the same time being pivoted about an axis of rotation running in the parting plane of the internal thread at a right angle to the thread axis.

Figure 12:
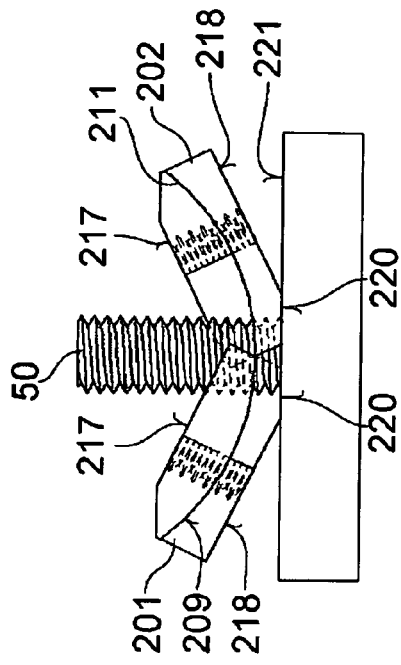
FIG. 12 shows a schematic diagram of the nut parts from FIGS. 9 through 11 while being applied to an external thread.
Figure 13:
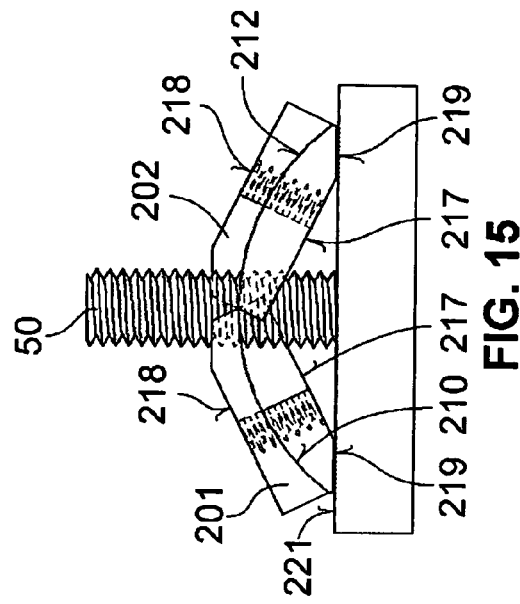
FIG. 13 shows the side view of the nut from FIG. 12.

FIGS. 12 through 15 show assembly aids which are situated on both nut parts 201, 202 of nut 200. In intermeshing of two nut parts 201, 202, they are pushed toward one another while pivoted by an angle, so the axes of thread sections 203, 204 should lie in one plane together with the axis of external thread 50. To ensure this position of the nut parts, the edges of top side 217 and bottom side 218 extending across the direction of displacement have inclined surfaces 219, 220. These inclined surfaces 219, 220 run parallel to one another in the position of nut parts 201, 202 in which the guidance according to the pivoting movement due to the cylindrically curved guide surfaces 209 through 212 starts. To join nut parts 201, 202, they may be placed with inclined surfaces 219 or 220 on a neighboring supporting surface 221 (see FIGS. 12 through 15) and the two nut parts are pushed onto one another, with external thread 50 forming a lateral guide for nut parts 201, 202. In FIGS. 12 and 13, nut parts 201, 202 are installed in such a way that their bottom side 218 is intended to be supported by supporting surfaces 221. Consequently, inclined surfaces 220 on the edges of bottom side 218 are in contact with supporting surface 221, so the corresponding inclination of nut parts 201, 202 is achieved. After pivoting nut parts 201, 202 along the lateral cylindrical surface on which their guide surfaces 209 through 212 are situated, two nut parts 201, 202 are in the use position close to supporting surface 221 and need only be tightened. Tightening requires only a few rotations of the nut. It is even possible to join the nut parts very close to the supporting surface, so that less than one revolution is required for tightening.

Figure 14:
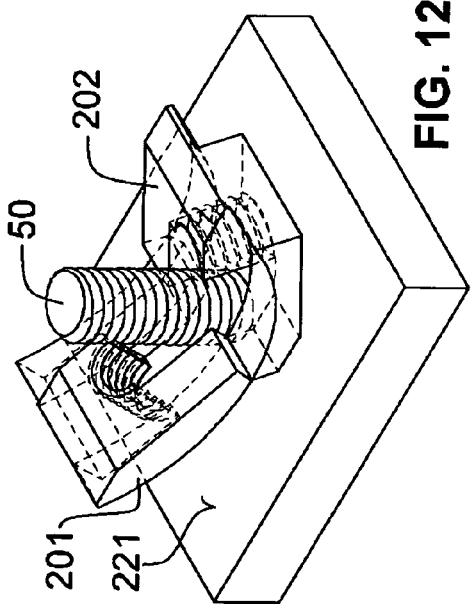
FIG. 14 shows a diagram corresponding to FIG. 12 in which the nut parts are rotated.
Figure 15:
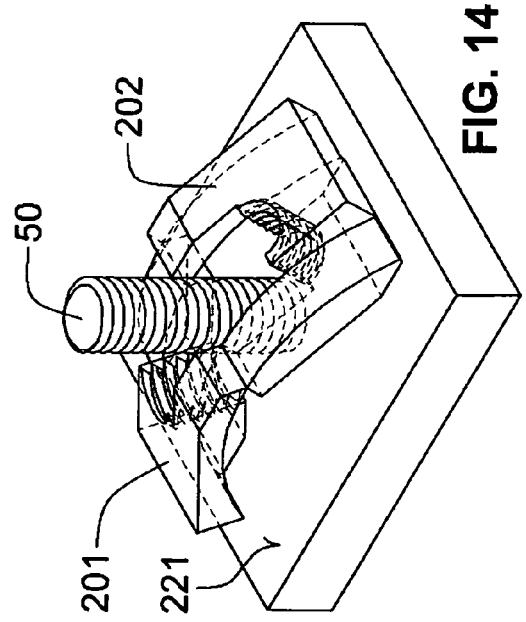
FIG. 15 shows a side view of the diagram from FIG. 14.
Figure 16:
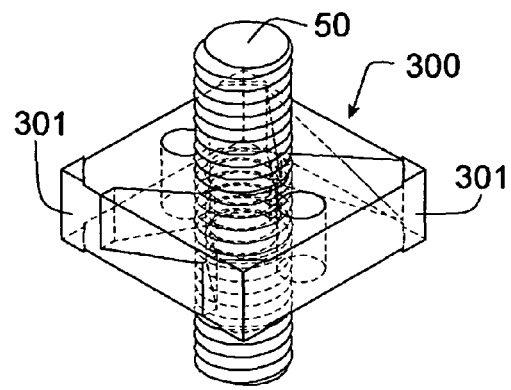
FIGS. 16-21 show a sequence of diagrams corresponding to FIGS. 1 through 6 of an additional embodiment of the nut.
Figure 17:
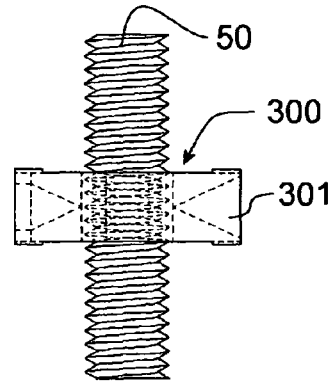
Figure 18:
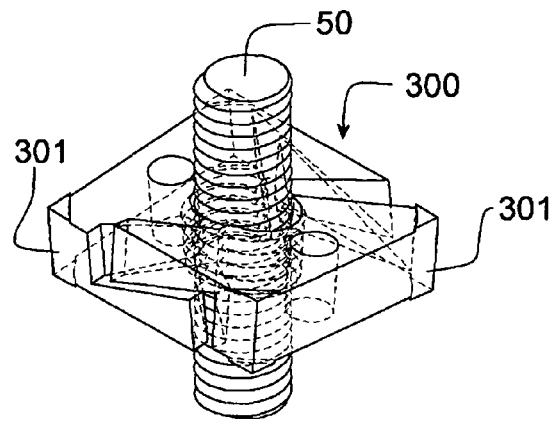
Figure 19:
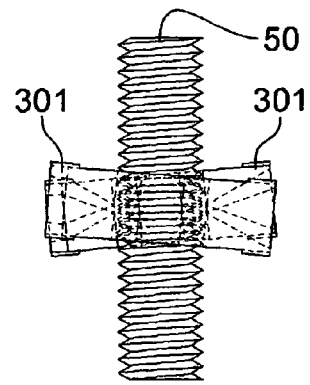
Figure 20:
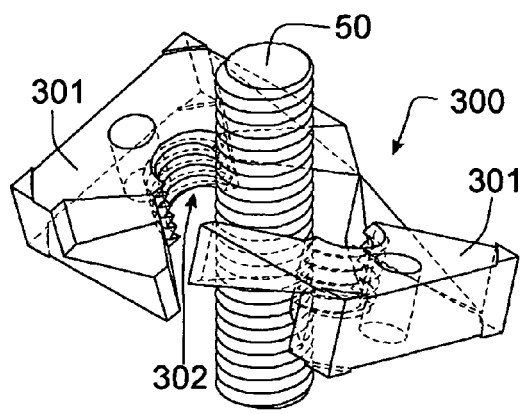
Figure 21:
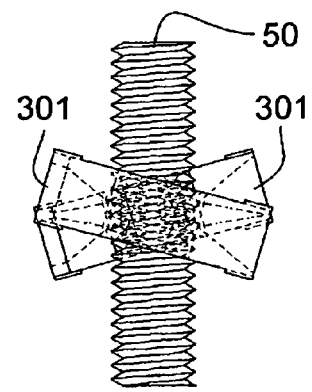

FIGS. 14 and 15 show nut parts 201, 202 in the inverted position. Top side 217, which is at the top in FIGS. 9 through 13, is now at the bottom and is opposite supporting surface 221. Accordingly, side 218, which is at the bottom in FIGS. 9 through 13, is at the top in the diagram according to FIGS. 14 and 15. Accordingly, inclined surfaces 219 are pressed against supporting surface 221, with nut parts 201, 202 then being pushed toward one another. Two inclined surfaces 219 and 220 form an angle with adjacent contact surface 217 and/or 218, corresponding to the angle of rotation by which part 201, 202 of the nut is rotated when it is moved into the use position from the position assumed after being joined initially (FIG. 12, 13 or 14, 15).

The curvature of at least one of guide surfaces 209-212 may deviate from the exact shape of the lateral cylindrical surface of the rotational movement. The concave surfaces in particular may have a somewhat greater curvature, and the convex surfaces have exactly the shape of a lateral cylindrical surface or may have a somewhat lesser curvature.

These deviations from the cylindrical curvature result in locking arms 206 and 207, which have concavely curved guide surfaces 210 and/or 211, being bent up slightly with an increase in axial pressure. Nut parts 201 and 202 are generally made of steel or a metal alloy, which has a certain elasticity. Elastic bending of locking arms 206, 207 has essentially the effect of a spring washer. When there are load fluctuations on external thread 50 onto which the nut is screwed, nut 200 does not become loose immediately but instead the stresses are dissipated due to elastic bending of locking arms 206, 207.

FIGS. 16 through 22 show another embodiment of a nut 300. It has two identical nut parts 301. Nut part 301 is shown enlarged in FIG. 22. It again has an internal thread section 302, which extends over 180° of the internal thread and is divided in a parting plane running diametrically to the internal thread and including the thread axis. Guide surfaces 303 and 304 run at an inclination to the radial plane. Their profile approximates the profile of a helical surface winding about the radius of the internal thread, which is at a right angle to the parting plane. As shown in FIGS. 16 through 21 in particular, two nut parts 301 are rotated helically when pushed together in the direction at a right angle to the parting plane. In the embodiment of nut 300 from FIGS. 16 through 22, guide surfaces 303 and 304 are not helical themselves but instead are designed to be planar, so there is no surface guidance but instead only a point of contact or linear contact in pushing nut parts 301 together or apart.

It is apparent here that when viewed from above, guide surface 303 has a different contour than guide surface 304. Guide surface 303 is situated on a locking arm 305 tapering to a point and opening into a butt-end face 307. Accordingly, another additional vertical guide surface 310 borders on additional vertical guide surface 309, which also delimits inclined guide surface 303; when two parts 301 are inserted one inside the other, this additional vertical guide surface is opposite end face 307 of locking arm 305. On the other end, locking arm 306 runs to an acute-angle edge 308. However, additional vertical guide surface 315, which is adjacent to second inclined guide surface 304 on second locking arm 306, runs at an acute angle to the outside surface in the area of second locking arm 306.

It is apparent here that nut part 301 may be joined to a second nut part 301 only when it is rotated about an axis running diametrically to the internal thread section 302, in the parting plane of internal thread section 302. Rotation of nut part 301 about the thread axis itself would essentially also result in a coincidence of inclined guide surfaces 304 and 303. However, internal thread sections 302 of two nut parts 301 would then no longer fit together, so the form-fitting contact with external thread 50 would no longer be obtainable. By shortening guide surface 303 on one side of nut part 301, an anti-twist protection of nut parts 301 is achieved. Nut parts 301 then fit together only when guide surface 303 is opposite an identically designed guide surface 303 of a second nut part 301.

FIGS. 16 through 22 also show that nut parts 301 have projections 311 in the area of all four corners. Since two identical nut parts are joined together to form the nut and are rotated about a horizontal axis in the parting plane of the thread, the two possible contact surfaces are formed by top side 312 (see FIG. 22) of the first nut part and bottom side 313 of the second nut part. When the contact surface of nut 300 is screwed against a supporting surface, projections 311 cause a slight elastic sagging of nut parts 301. Again, the effect of a spring washer in screwing nut 300 onto an external thread 50 against a supporting surface is achieved.

Figure 22:
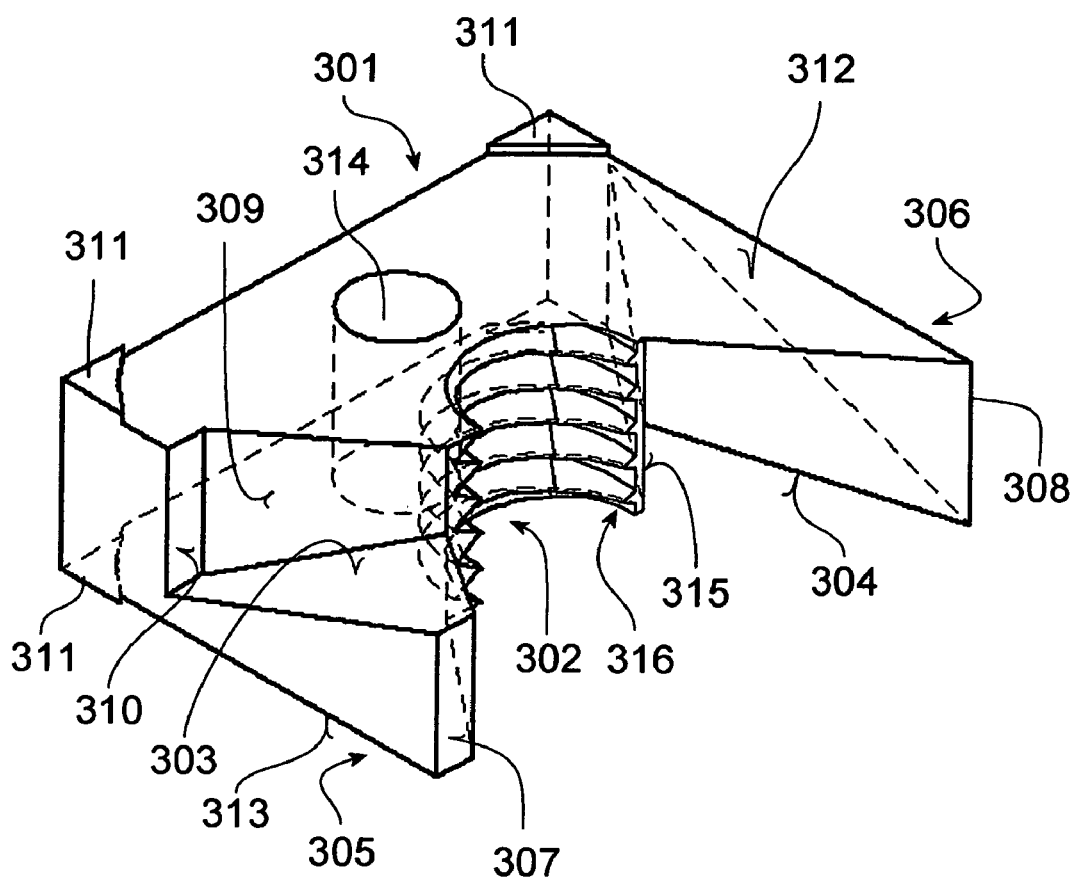
FIG. 22 shows a schematic diagram of one of the two identical nut parts from FIGS. 16 through 21.
Figure 23:
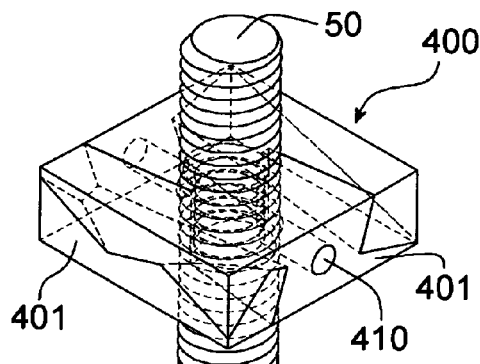
FIGS. 23-28 show a sequence of diagrams corresponding to FIGS. 1 through 6 of another embodiment of a nut according to the system described herein.

FIG. 22 also shows that an axial borehole 314 extends through nut part 301 parallel to thread section 302. A pin of a tool resembling pliers can be inserted into the axial borehole 314, the tool being used to join and detach two nut parts 301.

Finally, FIG. 22 shows where thread has been partly removed in the area of the thread flights in end area 316 at the right in the circumferential direction of internal thread section 302. The inside diameter of the thread flights increases in this end area toward the adjacent area of the parting plane. In the parting plane, the thread flights on right end area 316 of internal thread section 302 have less than half the height as on the left starting area of internal thread section 302. This partial removal of thread flights prevents the thread flights in end area 316 from colliding with the thread flights of external thread 50 when nut 300 is mounted on an external thread 50, which could block the rotation of nut parts 301 into the use position. Furthermore, the acute taper of the thread flights in end area 316 facilitates the thread-cutting action of the thread flights of nut part 301. When nut 300 is applied to a plastic cable or a plastic pin without an external thread and when tightening nut 300, the thread flights of the nut part penetrate into the plastic material, initially with the tips in end area 316 and then increasingly deeper, thereby forming the external thread as the nut is screwed onto the plastic material.

Figure 24:
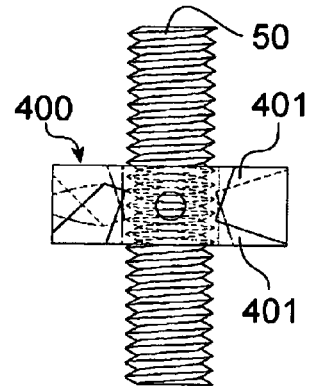
Figure 25:
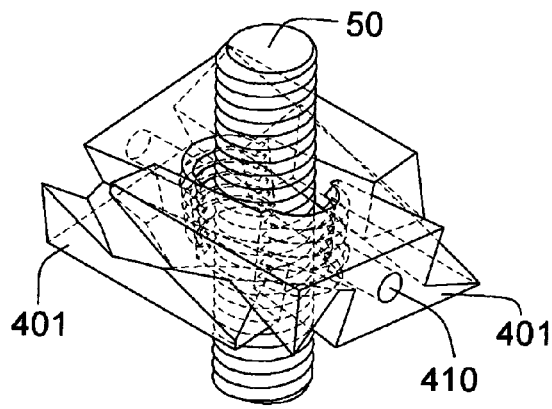
Figure 26:
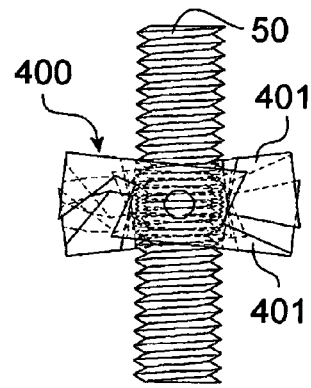
Figure 27:
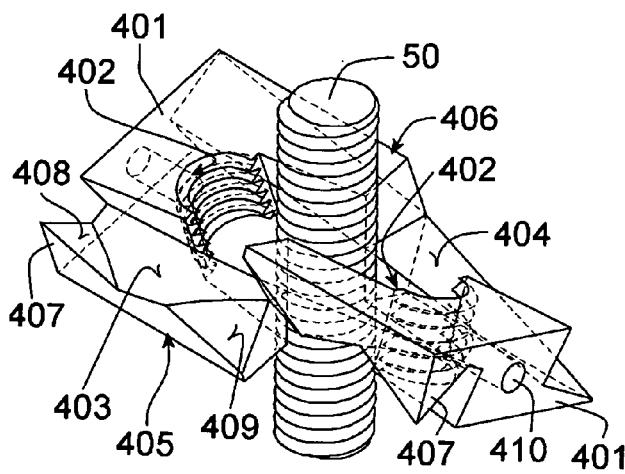
Figure 28:
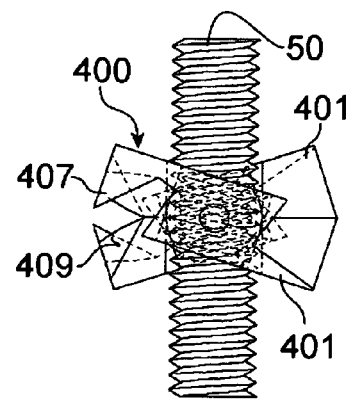

FIGS. 23 through 28 show another embodiment of a nut 400 according to the system described herein. FIG. 24 here corresponds to a side view from the left rear of nut 400 from FIG. 23. Accordingly, FIGS. 26 and 28 show side views from the left rear of nut parts 401 of nut 400 from FIGS. 25 and 27.

Both nut parts 401 are again identical. In the embodiment shown in FIGS. 23 through 28, guide surfaces 403 and 404 run on a helical surface, which winds by a few degrees (approx. 5° to 10° helix angle) about the axis running diametrically to the internal thread and perpendicular to the parting plane of internal thread sections 402. Nut parts 401 in the embodiment according to FIGS. 23 through 28 also have anti-twist protection. A tip 407 having a triangular stop surface 408 is adjacent to helical guide surface 403 on one side. Accordingly, locking arm 405 on which guide surface 403 is situated has a triangular inclined surface in the area of the front corner of locking arm 405, which is in contact with stop surface 408 of tip 407.

Borehole 410 to receive a pin of a connecting tool resembling pliers extends here essentially in the direction of displacement of two nut parts 401. The axis of borehole 410 is on a diameter of external thread 50 or a radius of each internal thread section 402 running at a right angle to the parting plane of internal thread sections 402. The axis coincides with the direction of displacement and the axis of rotation for the rotational movement in joining the parts. Consequently, nut parts 401 are able to rotate about the axis of borehole 410, so that the pin of the tool itself need not be designed to be rotatable.

Figure 29:
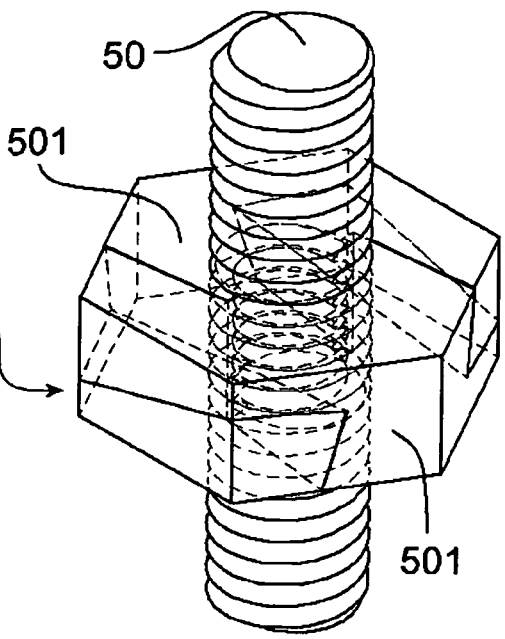
FIG. 29 shows a schematic diagram of another embodiment of the nut according to the system described herein.
Figure 30:
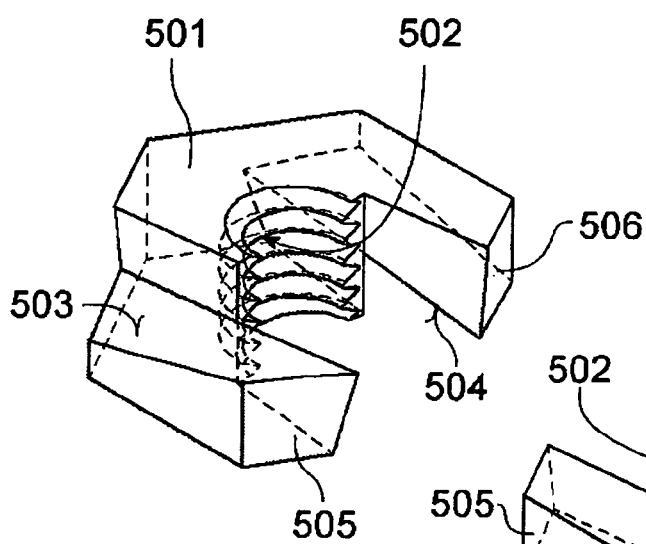
FIG. 30 shows a schematic exploded view of the two nut parts from FIG. 29.
Figure 31:
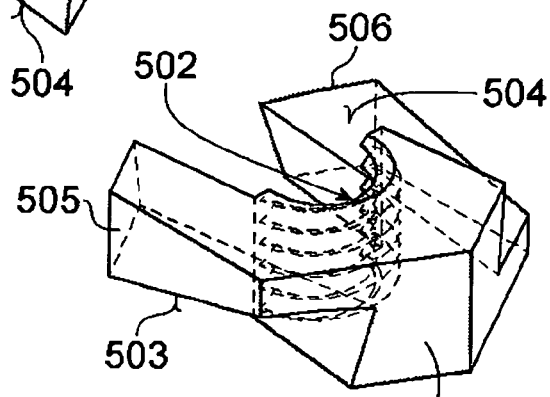
FIG. 31 shows a top view of one of the nut parts from FIGS. 29 and 30.
Figure 31:
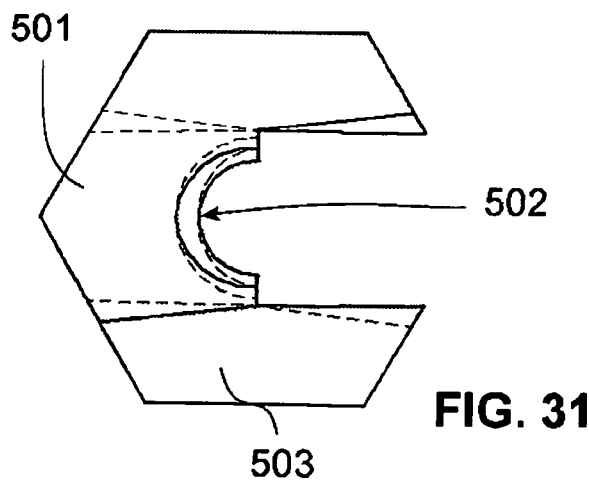

FIGS. 29 through 31 show an embodiment of nut 500 which is very similar to the embodiment from FIGS. 23 through 28. Nut parts 501 of the nut correspond essentially to nut parts 401 of nut 400 except for tip 407 and inclined surface 409 for anti-twist protection and except for borehole 410 to receive a pin of a tool. Another difference is that nut 500 is designed to be hexagonal. The hexagonal shape was achieved by symmetrically cutting the corners of square nut 400 from FIGS. 23 through 28, in such a way that the new nut 500 has a corner angle of 60°. This shows that guide surfaces 503 and 504 are wound in a helical manner around an axis running at a right angle to the parting plane of internal thread sections 502.

FIG. 32 shows a nut part 601 of an embodiment of the nut according to the system described herein having the same contour as nut part 501 but having convex and concave guide surfaces. Nut part 601 has a groove 603 in the area of the lower end of internal thread 602, the lower wall of this groove forming a shoulder 604 extending toward the axis of the internal thread. One-half of a ring-shaped collar 605 of a hat-shaped pipe connection 606 may be inserted into this half ring groove 603. The second half of collar 605 may be inserted into a corresponding groove on the complementary nut part (not shown). Shoulder 604 presses collar 605 of pipe connection 606 against the end wall of an external thread (not shown) onto which the internal thread of nut part 601 is screwed. A nut having two nut parts 601 may thus be used as a union nut. The groove may deviate from a round shape and may accommodate a collar having a complementary shape in a rotationally fixed and positive manner.

FIGS. 33 and 34 show a nut 700 having retaining elements which secure the two nut parts 701 and 702 to one another in a partially assembled position (see FIG. 33). Nut parts 701, 702 each have a locking arm 707 having a concave guide surface 705 and a locking arm 708 having a convex guide surface 703. Convex guide surfaces 703 have recesses 704 extending across the length of locking arms 708. Recesses 704 are only a few µm deep and are rounded. They are situated approximately at a distance from one end of guide surface 703 corresponding to one-third of the length of guide surface 703.

However, concave guide surfaces 705 opposite convex guide surfaces 703 have projections 706 in the same location. Projections 706 are designed as flat bulges a few µm in height running transversely to guide surface 705.

When nut parts 701 and 702 are pushed completely one inside the other and extend around an internal thread with a small clearance, projections 706 extend into recesses 704 and thereby lock the two nut parts to one another. When nut parts 701, 702 are pushed out of this position relative to one another, so that locking arms 707, 708 only approximately halfway cover one another, then only one projection 706 on a concave guide surface 705 extends into a recess 704 of opposing convex guide surface 703. When they protrude into one another, recesses 704 and projections 706 form retaining elements, securing nut parts 701, 702 against one another. This is the case with the partially inserted position shown in FIG. 33 and with the completely inserted position. Securing or locking the parts relative to one another has the advantage that nut parts 701, 702 may be shipped in a partially assembled position without a risk that they may become detached from one another. In the closed position, retaining elements 704, 706 also exert an additional retaining force. Because of the low height of recesses 704 and projections 706, nut parts 701, 702 may be displaced manually toward one another without the displacement being hindered due to recesses 704 and projections 706. These may also yield due to elastic deformation of locking arms 707, 708, which are preferably made of metal.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A nut, comprising:
an internal thread; and
at least two parts, each of the parts including a section of the internal thread which is radially pushable onto an external thread; and
cooperating connecting elements which allow a relative displacement of the parts in a direction running radially to an axis of the internal thread until reaching a use position in which the internal thread of the nut surrounds the external thread with a small clearance, the connecting elements having guide surfaces which are inclined by an angle to a plane running radially to the axis of the internal thread and which guide the parts of the nut in displacement into the use position in a rotational movement about an axis of rotation running across the axis of the internal thread, wherein at least one part has at least one locking arm which has on only one side a guide surface, which induces a rotational movement when the parts are displaced and is in contact with a complementary guide surface of the other part.

2. The nut as recited in claim 1, wherein the internal thread sections of the two parts are separated along a parting plane extending in the direction of the thread axis, and each part of the nut has two guide surfaces which are situated on both sides of a central plane at a right angle to the parting plane, the two guide surfaces being oriented in opposite directions with respect to the thread axis.

3. The nut as recited in claim 1, wherein the internal thread sections of the two parts are divided along a parting plane extending in the direction of the thread axis, and each part of the nut has two guide surfaces on both sides of the parting plane, the guide surfaces on the two sides of the parting plane being oriented in opposite directions with respect to the thread axis and being inclined in opposite directions to the radial plane of the thread.

4. The nut as recited in claim 1, wherein the guide surfaces are curved.

5. The nut as recited in claim 4, wherein the guide surfaces have the form of a lateral cylindrical section.

6. The nut as recited in claim 5, wherein the axis of the internal thread coincides with a radius of the cylinder on whose lateral surface the guide surfaces run.

7. The nut as recited in claim 2, wherein the guide surfaces run along a helical surface.

8. The nut as recited in claim 7, wherein the helical surface of the guide surfaces is wound around an axis running at a right angle to the parting plane of the thread sections of the nut and radially to the axis of the internal thread.

9. The nut as recited in claim 1, wherein the parts are made of an elastically deformable material.

10. The nut as recited in claim 1, wherein the parts have additional guide surfaces that are in contact with one another and are situated in a plane extending parallel to the axis of the internal thread.

11. The nut as recited in claim 10, wherein the additional guide surfaces are situated in a plane extending parallel to the axis of the internal thread and extend parallel to the radial direction in which the parts are displaceable relative to one another.

12. The nut as recited in claim 1, wherein the parts in the use position have a shared contact surface, which is in contact with a supporting surface connected to an external thread when the nut is tightened into the external thread.

13. The nut as recited in claim 12, wherein the contact surface of each part has on one edge an inclined surface, which forms an angle to the contact surface corresponding to the angle of rotation when the part is placed in the use position.

14. The nut as recited in claim 1, wherein the parts in the use position each have at least one contact point which is supported against a supporting surface connected to an external thread when the nut is tightened onto the external thread.

15. The nut as recited in claim 14, wherein the contact point defines, together with at least two additional points in the edge area of a part, an inclined surface which forms an angle with the supporting surface corresponding to the angle of rotation when the part is placed in the use position.

16. The nut as recited in claim 1, wherein the thread flights are partially removed in at least one end area of the internal thread section of at least one of the parts.

17. The nut as recited in claim 1, wherein the at least two parts are identical parts.

18. The nut as recited in claim 1, wherein, in the use position, the parts are rotated by 180° relative to one another about at least one of the following axes:
the axis of the internal thread, and
an axis extending radially to the internal thread and in the parting plane of the inside thread sections.

19. The nut as recited in claim 1, wherein each of the parts is manufactured in a compression molding operation.

20. The nut as recited in claim 1, further comprising:
cooperating retaining elements which secure the parts in an at least partially assembled position.

21. The nut as recited in claim 20, wherein the retaining elements include at least one of the following cooperating devices:
mutually attracting magnets;
a magnet and a ferromagnetic material;
catch projections and catch recesses receiving the catch projections; and
adhesive surfaces having elevated friction or adhesion.

22. The nut as recited in claim 1, further comprising:
a shoulder extending toward the axis of the internal thread and situated in the area of one end of the internal thread.

23. The nut as recited in claim 22, wherein the shoulder is a wall of a groove adjacent to the internal thread.

24. A nut, comprising:
an internal thread; and
at least two parts, each of the parts including a section of the internal thread; and
connecting elements that allow a relative displacement of the parts in a direction running radially to an axis of the internal thread, the connecting elements having guide surfaces which are inclined by an angle to a plane running radially to the axis of the internal thread and which guide the parts of the nut in a rotational movement about an axis of rotation running across the axis of the internal thread,
wherein at least one part has at least one locking arm, the at least one locking arm having a guide surface on one side only, wherein the at least one locking arm induces the rotational movement when the parts are displaced.

25. The nut as recited in claim 24, wherein the internal thread sections of the two parts are separated along a parting plane extending in the direction of the axis of the internal thread, and each part of the nut has two guide surfaces which are disposed on both sides of a central plane at a right angle to the parting plane, the two guide surfaces being oriented in opposite directions with respect to the axis of the internal thread.

26. The nut as recited in claim 24, wherein the internal thread sections of the two parts are divided along a parting plane extending in the direction of the axis of the internal thread, and wherein each part of the nut has two guide surfaces on both sides of the parting plane, the guide surfaces on the two sides of the parting plane being oriented in opposite directions with respect to the axis of the internal thread and being inclined in opposite directions to a radial plane of the thread.

27. The nut as recited in claim 24, wherein the parts, in a use position, have at least one shared contact surface which is in contact with a surface connected to an external thread when the nut is tightened onto the external thread.

28. The nut as recited in claim 24, further comprising:
retaining elements that secure the parts in an at least partially assembled position.

29. The nut as recited in claim 28, wherein the retaining elements include at least one of the following devices: mutually attracting magnets; a magnet and a ferromagnetic material; catch projections and catch recesses receiving the catch projections; and adhesive surfaces having elevated friction or adhesion.

* * * * *